(12) United States Patent
Sakurai et al.

(10) Patent No.: US 8,535,765 B2
(45) Date of Patent: Sep. 17, 2013

(54) METHOD OF PRODUCING A LOW-MOLECULAR LUMINOUS MATERIAL DISPERSANT, AN APPARATUS FOR PRODUCING A LOW-MOLECULAR LUMINOUS MATERIAL DISPERSANT AND A LOW-MOLECULAR LUMINOUS MATERIAL DISPERSANT

(75) Inventors: Naoaki Sakurai, Yokohama (JP); Hiroyasu Kondo, Yokohama (JP); Hiroshi Koizumi, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

(21) Appl. No.: 12/556,080

(22) Filed: Sep. 9, 2009

(65) Prior Publication Data

US 2010/0072423 A1    Mar. 25, 2010

(30) Foreign Application Priority Data

Sep. 22, 2008  (JP) .................. 2008-242086
Sep. 3, 2009   (JP) .................. 2009-203798

(51) Int. Cl.
  *B05D 1/02*    (2006.01)
  *C23C 16/00*   (2006.01)
  *C09K 11/06*   (2006.01)

(52) U.S. Cl.
  USPC ............. 427/447; 427/255.25; 252/301.17

(58) Field of Classification Search
  USPC ........... 252/301.16–301.32; 427/447, 255.25
  See application file for complete search history.

(56) References Cited

FOREIGN PATENT DOCUMENTS

JP   2002-121606        4/2002
WO   WO 2005/032216 A1  4/2005

OTHER PUBLICATIONS

Cho. Decreased phase transition temperatures of Alq3 nanoparticles. Nanotechnology 17 (2006) 3756-3760.*
Chiu. Tris-(8-hydroxyquinoline) aluminum nanoparticles prepared by vapor condensation. Appl. Phys. Lett. 83, 347 (2003).*
Japanese Office Action issued Nov. 13, 2012 in Patent Application No. 2009-203798 with English Translation.

* cited by examiner

*Primary Examiner* — Carol M Koslow
*Assistant Examiner* — Matthew E Hoban
(74) *Attorney, Agent, or Firm* — Oblon, Spivak, McClelland, Maier & Neustadt, L.L.P.

(57) ABSTRACT

A method of producing a low-molecular luminous material dispersant having: inserting a coat agent in gas phase and an inner gas into a vacuum atmosphere, wherein the coat agent has a strong affinity for a solvent when the coat agent is in liquid phase; heating and vaporizing a low-molecular luminous material in the vacuum atmosphere so as to obtain a mix gas comprising the low-molecular luminous material and inner gas; cooling the mix gas so as to obtain a coat agent in liquid phase; and recovering the coat agent in liquid phase and adding the coat agent in liquid phase into the solvent so as to obtain the low-molecular luminous material dispersant.

17 Claims, 1 Drawing Sheet

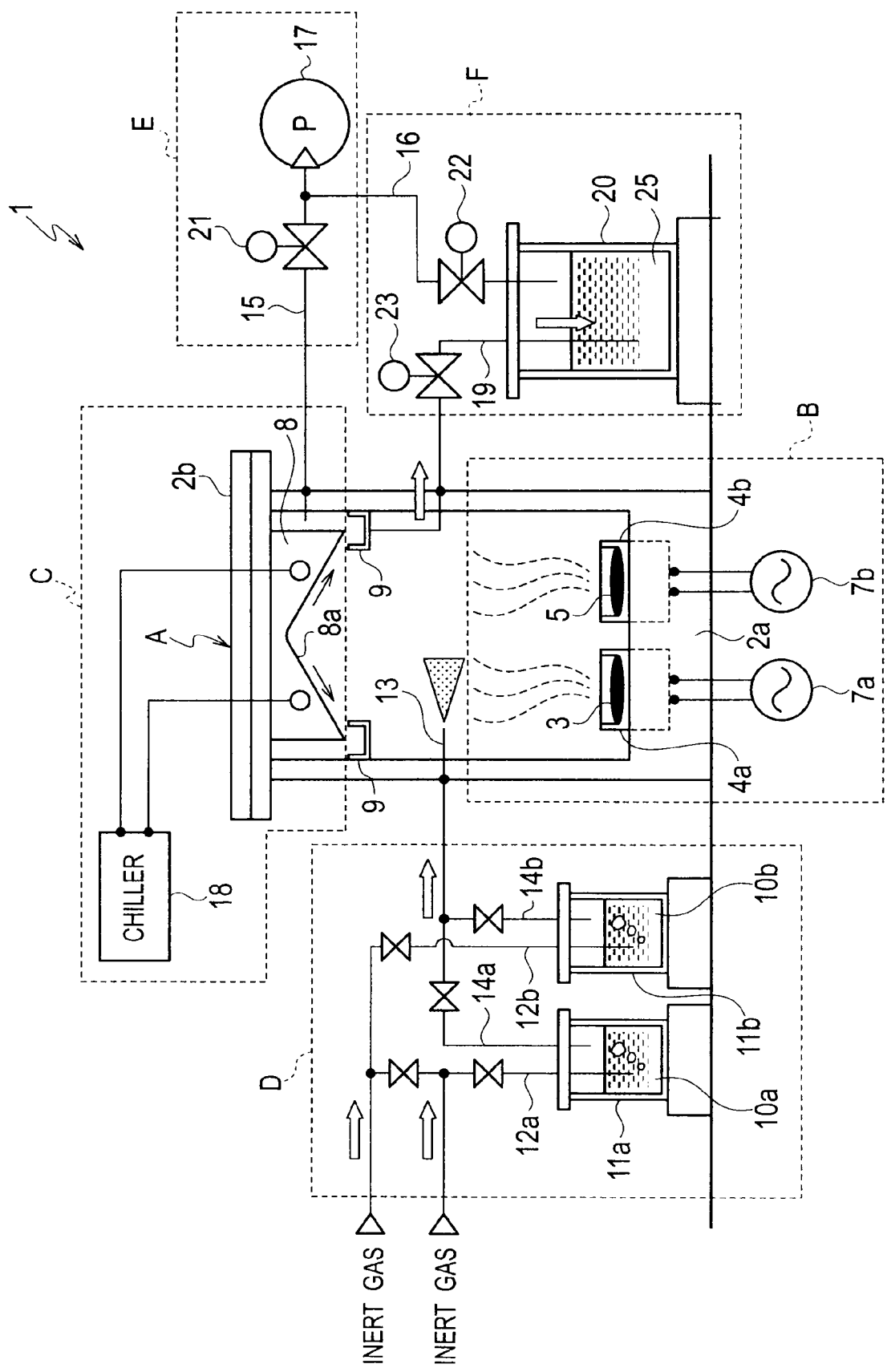

METHOD OF PRODUCING A LOW-MOLECULAR LUMINOUS MATERIAL DISPERSANT, AN APPARATUS FOR PRODUCING A LOW-MOLECULAR LUMINOUS MATERIAL DISPERSANT AND A LOW-MOLECULAR LUMINOUS MATERIAL DISPERSANT

CROSS-REFERENCE TO RELATED APPLICATION AND INCORPORATION BY REFERENCE

This application claims benefit of priority under 35 USC 119 based on Japanese Patent Application P2008-242086, filed Sep. 22, 2008, and Japanese Patent Application P2009-203798, filed Sep. 3, 2009, the entire contents of which are incorporated by reference herein.

BACKGROUND OF THE INVENTION

1. Field of the Invention

This invention relates to a method of producing a low-molecular luminous material dispersant, an apparatus for producing a low-molecular luminous material dispersant and a low-molecular luminous material dispersant 2. Description of the Related Art As one of EL (Electroluminescence) materials emitting light with an electric field being applied, the organic EL materials that luminescence materials are organic materials are known. As for the organic EL materials, luminescence materials are classified mainly into high molecule organic EL materials made of a polymer-shaped molecule and low molecule organic EL materials (a fluorescent luminous material and a phosphorescent luminous material). Low molecule organic EL materials are widely used as a phosphorescent membrane on the organic EL display bases etc. because Low molecule organic EL materials have a long lifetime of luminescence and high luminescence efficiency in comparison with high molecule organic EL materials (see a Japanese Patent Laid-Open No. 2002-121606 bulletin).

A low-molecular organic EL material is deposited by evaporation on a substrate by an evaporation method to heat a material to vaporize in a vacuum atmosphere. However, when depositing by the evaporation method, it is difficult to deposit a luminescence film with a uniform film thickness on a large area substrate. Meanwhile, in order to solve such a problem, a method of depositing the low-molecular organic EL material on the substrate by utilizing an applying method to apply solvent in which the material is dissolved is considered. However, the low-molecular organic EL material is not dissolved in the solvent without change of a chemical structure thereof (solvent solubilization). Therefore, when using the solvent solubilization method, a characteristic such as luminescence efficiency and lifetime of luminescence of the low-molecular organic EL material is lost due to the change of the chemical structure.

SUMMARY OF THE INVENTION

According to a first aspect of the present invention, a method of producing a low-molecular luminous material dispersant having: inserting a coat agent in gas phase and an inner gas into a vacuum atmosphere, wherein the coat agent has a strong affinity for a solvent when the coat agent is in liquid phase; heating and vaporizing a low-molecular luminous material in the vacuum atmosphere so as to obtain a mix gas comprising the low-molecular luminous material and inner gas; cooling the mix gas so as to obtain a coat agent in liquid phase; and recovering the coat agent in liquid phase and adding the coat agent in liquid phase into the solvent so as to obtain the low-molecular luminous material dispersant.

According to second aspect of the present invention, an apparatus for producing a low-molecular luminous material dispersant having: a vacuum chamber; a gas exhaust unit depressurizing a vacuum chamber in a vacuum atmosphere; a gas supply unit inserting a coat agent in gas phase and an inner gas into a vacuum atmosphere, wherein the coat agent has a strong affinity for a solvent when the coat agent is in liquid phase; a heating and vaporizing unit heating and vaporizing a low-molecular luminous material in the vacuum chamber so as to obtain a mix gas comprising the low-molecular luminous material and inner gas; a cooling unit cooling the mix gas so as to obtain a coat agent in liquid phase; and a recovering unit recovering the coat agent in liquid phase and adding the coat agent in liquid phase into the solvent so as to obtain the low-molecular luminous material dispersant.

According to third aspect of the present invention, a low-molecular luminous material dispersant, wherein a low-molecular luminous material coated with a coat agent is dispersed in a solvent, the coat agent has a strong affinity for the solvent.

BRIEF DESCRIPTION OF DRAWINGS

FIG. 1 illustrates a schematic diagram showing a structure of an apparatus for producing low-molecular luminous material dispersant 1 according to an embodiment of the present invention.

DETAILED DESCRIPTION OF THE INVENTION

The present invention will be described below by giving an embodiment. The present invention is not limited to the following embodiment. Parts having the same or similar functions in the drawings are indicated by the same or similar reference numerals and the description is omitted.

According to the method of producing the low-molecular luminous material dispersant, the apparatus for producing the low-molecular luminous material dispersant, and the low-molecular luminous material dispersant according to the present invention, the low-molecular luminous material may be dispersed in the solvent, so that it is possible to apply the low-molecular luminous material on the substrate without changing the feature of the low-molecular luminous material.

[An Apparatus for Producing a Low-Molecular Luminous Material Dispersant]

As shown in FIG. 1, an apparatus for producing a low-molecular luminous material dispersant 1 having: a vacuum chamber A; a gas exhaust unit E depressurizing a vacuum chamber in a vacuum atmosphere; an gas supply unit D inserting a coat agent in gas phase and an inner gas into a vacuum atmosphere, wherein the coat agent has a strong affinity for a solvent when the coat agent is in liquid phase; a heating and vaporizing unit B heating and vaporizing a low-molecular luminous material in the vacuum chamber so as to obtain a mix gas comprising the low-molecular luminous material and inner gas; a cooling unit C cooling the mix gas so as to obtain a coat agent in liquid phase; and a recovering unit F recovering the coat agent in liquid phase and adding the coat agent in liquid phase into the solvent so as to obtain the low-molecular luminous material dispersant.

[Vacuum Chamber]

The vacuum chamber A has a vacuum chamber body 2a and a lid 2b detachably air-tightly mounted on an upper portion of the vacuum chamber body 2a.

[Heating and Vaporizing Unit]

Heating and vaporizing unit B has crucibles 4a, 4b, and heaters 7a, 7b. A crucible 4a filled with a low-molecular luminous material 3 and a crucible 4b filled with dopant (dye material for adjusting chromaticity) 5 are mounted on an inner bottom surface of the vacuum chamber body 2a. Heating heaters 7a and 7b for heating the crucibles to heat the filled material to evaporate are connected to the crucibles 4a and 4b, respectively.

[Cooling Unit]

A cooling unit C has a cylindrical trap plate 8 and a chiller 18. A cylindrical trap plate 8 is provided on a rear surface side of the lid 2b. The trap plate 8 faces the inner bottom surface of the vacuum chamber body 2a when being mounted on the vacuum chamber body 2a. A conical concave portion is formed on a surface of the trap plate 8. The trap plate 8 is configured that liquid, which drops down along a concave portion surface 8a, drops down to a gutter portion 9 formed on an inner surface of the vacuum chamber body 2a.

The chiller 18 is connected to the trap plate 8. The chiller 18 cools down the trap plate 8 by circulating a refrigerant in the trap plate 8. Although there are may types of the chiller 18 such as an air-cooling type and a water-cooling type according to types of the refrigerant, the present invention is not limited by the types of the refrigerant, and any chiller may be used in this embodiment as long as this is capable of cooling down the trap plate 8 to approximately −20° C.

[Gas Supply Unit]

The gas supply unit D has a container 11a for holding a coat agent 10a in a high-volatile liquid state inside thereof; a container 11b for holding a coat agent 10b in a high-volatile liquid state; gas supply channels 12a and 12b for supplying (bubbling) inert gas into the coat agents 10a and 10b in the containers 11a and 11b, respectively; and gas supply channels 14a and 14b for supplying gas in the containers 11a and 11b into the vacuum chamber through a gas supply opening 13, respectively. Although not shown, the containers 11a and 11b are provided with heating heaters for promoting vaporization of the coat agents 10a and 10b inside thereof. Although it is not described in detail, open/close valves are provided on the gas supply channels 12a, 12b, 14a and 14b, and it is configured such that a gas supply amount and a type of gas may be changed between two systems of the gas supply channels.

[Gas Exhaust Unit]

The gas exhaust unit E is provided with a vacuum pump 17 for exhausting the gas in the vacuum chamber A and a collection chamber 20 (to be described later in detail) through the gas exhaust channels 15 and 16 to depressurize. Although there are many modes of vacuum pump 17, any pump, which may depressurize the inside of the vacuum chamber A to approximately 70 Pa, may be used in this embodiment.

[Recovering Unit]

The recovering unit F has a liquid recovery channel 19 for recovering the liquid dropping down to the gutter portion 9 and the collection chamber 20 for holding main solvent 25 therein. The liquid recovered by the liquid recovery channel 19 is added to the main solvent 25 held in the collection chamber 20. Meanwhile, although not shown, it is also possible to provide a stirring mechanism on the collection chamber 20 to stir the main solvent 25 when the liquid is added to the main solvent 25.

[Method of Producing a Low-Molecular Luminous Material Dispersant]

Next, the method of producing the low-molecular luminous material dispersant utilizing the apparatus for producing a low-molecular luminous material dispersant 1 of FIG. 1 is described.

(a) First, the apparatus for producing a low-molecular luminous material dispersant 1 of FIG. 1 is prepared. Next, the lid 2b is removed from the vacuum chamber body 2a, the crucibles 4a and 4b are filled with Tris(8-hydroxyquinolinato) aluminum (Alq 3) 3 and the dopant 5, respectively, and thereafter, the lid 2b is air-tightly mounted on the upper portion of the vacuum chamber body 2a. The inside of the vacuum chamber A is depressurized to a vacuum degree of approximately −70 Pa by driving the vacuum pump 17. Next, tetradecane 25 as the main solvent is introduced into the collection chamber 20, and octylamine as the coat agents 10a and 10b having high affinity with tetradecane 25 is introduced into the containers 11a and 11b.

(b) Inserting a coat agent 10a, 10b in gas phase and an inert gas into a vacuum chamber (atmosphere) A, wherein the coat agent 10a, 10b has a strong affinity for tetradecane 25 as a solvent when the coat agent 10a, 10b is in liquid phase. For example, octylamine 10a, 10b in the containers 11a and 11b is heated, and He gas as an inert gas is introduced into octylamine 10a, 10b through the gas supply channels 12a and 12b. Thereby, the inert gas including vaporized octylamine 10a, 10b is introduced into the vacuum chamber A through the gas supply channels 14a and 14b and the gas supply opening 13.

(c) Heating and vaporizing a low-molecular luminous material in the vacuum chamber (atmosphere) A so as to obtain a mix gas comprising the low-molecular luminous material and inner gas. For example, Alq3 and the dopant 5 are heated to approximately 400° C. to evaporate by driving the heating heaters 7a and 7b.

(d) Cooling the mix gas so as to obtain a coat agent in liquid phase. For example, the trap plate 8 is cooled down to −20° C. by driving the chiller 18. By a sequence of processes, octylamine 10a, 10b and Alq3 included in the inert gas are liquefied and solidified, respectively, on the concave portion surface 8a of the trap plate 8, and octylamine 10a, 10b in a liquid state including solidified Alq3 flows into the gutter portion 9. Meanwhile, at that time, the open/close state of the open/close valve 23 provided on the liquid recovery channel 19 is controlled to be the closed state.

(e) Recovering octylamine 10a, 10b as the coat agent in liquid phase and adding octylamine 10a, 10b in liquid phase into the solvent so as to obtain the low-molecular luminous material dispersant. For example, after stopping introducing the inert gas into the vacuum chamber A and driving the chiller 18, the drive of the vacuum pump 17 is stopped and the pressure in the vacuum chamber A is returned to an atmosphere pressure.

Next, by driving the vacuum pump 17 after controlling the open/close state of the open/close valves 21 and 22 to the opened state and the closed state, respectively, the inside of the collection chamber 20 is depressurized. Next, the open/close state of the open/close valve 23 provided on the liquid recovery channel 19 is switched from the closed state to the opened state. Thereby, octylamine 10a, 10b including Alq3 flowing into the gutter portion 9 is sucked in the collection chamber 20 side and is added to tetradecane 25.

As already described, octylamine 10a, 10b has the high affinity with tetradecane 25, which is the main solvent. Therefore, the low-molecular luminous material dispersant in which Alq3 is dispersed is produced by the sequence of processes.

As described above, according to the apparatus for producing the low-molecular luminous material dispersant and the method of producing the same according to the embodiment of the present invention, when Alq3 is used as a low-molecular luminous material, Alq3 may be dispersed in tetradecane 25, it is possible to apply Alq3 on the substrate without changing the feature of Alq3. Also, although it is not possible to dissolve Alq3 exceeding a saturation concentration when dissolving Alq3 in the solvent in general, since Alq3 is dispersed according to the apparatus for producing the low-molecular luminous material dispersant and the method of producing the same, which is the embodiment of the present invention, highly-concentrated Alq3 dispersant may be produced, and as a result, application work may be efficiently performed by using the highly-concentrated dispersant.

It is considered that Alq3 is dispersed in tetradecane 25 in a state coated with octylamine 10a, 10b. Therefore, it is possible to remove octylamine 10a, 10b and tetradecane 25 by heating the substrate to dry after applying the dispersant on the substrate by using an inkjet device. Thereby, it is possible to form the light-emitting film formed of Alq3, which may generally be formed only by the evaporation method, by the applying method without losing the characteristic of Alq3. Also, as a result, the light-emitting film formed of Alq3 may be formed on the large area substrate.

OTHER EMBODIMENTS

As described above, while the present invention has been described according to the embodiments, the descriptions and the drawings configuring a part of this disclosure do not limit the scope of the present invention. This disclosure allows those skilled in the arts to know a variety of substitutive embodiments, working examples and operational techniques.

For example, in a the present embodiment, octhyl amine was used as coat agent 10a, 10b, but the present invention needs not to be limited to this, and, in other words, the primary amine such as buthyl amine, dodecyl amine, hexadodecyl amine, octadodecyl amine, Coco amine, tallow amine, hydroxylated tallow amine, oleylamine, lauryl amine, stearyl amine, cyclohexyl amine, the solvent pro-sum nature with the main solvent can use a high low boiling point organic matter. In addition, in a the present embodiment, tetradecane 25 was used as the main solvent, but the present invention needs not to be limited to this, and a normal chain non-polarity solvent aside from tetra dodecane such as decane, dodecane can be used.

Although Tris(8-hydroxyquinolinato)aluminum (Alq3) is used as the low-molecular luminous material in this embodiment, the present invention is not limited to this embodiment, and any low-molecular luminous material capable of being used as an electron-injection layer (light-emitting layer) may be used.

For example as a low-molecular luminous material, there are mainly a low-molecular luminous material and a phosphorescent luminous material. As a low-molecular luminous material, for example
Tris(8-hydroxyquinolinato)aluminum(III) (Alq3); bis(10-hydroxybenzo[h]quinolinato)beryllium (BeBq2); Bis(8-quinolinolato)zinc (Znq2); (1,10-Phenanthroline)tris[4,4,4-trifluoro-1-(2-thienyl)-1,3-butanedionato]europium(III) (Eu [TTA]3(Phen)); Perylene; Quinacridone; coumarin; Rubrene; and 4-(dicyanomethylene)-2-t-butyl-6-(1,1,7,7-tetramethyljulolidyl-9-enyl)-4H-pyran (DCJTB) can be used.

As a phosphorescent luminous material, for example Pt(II) Octaethylporphine(PtOEP); (bis(2-(2'-benzothienyl)-pyridinato-N,C3')iridium(III)(acetylacetonate)) (Ir(btp)2(acac)); Tris(2-phenyl pyridine) iridium(III) (Ir(ppy)3); Iridium(III) Bis(2-(4,6-difluorephenyl)pyridinato-N,C2)picolinate (Firpic); Bis(4',6'-difluorophenylpyridinato)tetrakis(1-pyrazolyl)borate (Fir6); Iridium(III)Bis(2-(4,6-difluorephenyl) pyridinato-N,C2)picolinate (FIr(pic)); Iridium(III)Tris(2-(4-totyl)pyridinato-N,C2) (Ir (M-ppy)3); Iridium(III)Tris(2-(2'-benzothienyl)pyridinato-N,C3' (Ir (btp)3); Bis(dibenzo[f, h]quinoxaline)iridium(III) (Ir (DBQ)2 acac); Iridium(III)bis (2'-para-tol-ylpyridnato-N,C2')diethyl bis(1-pyrazoly)borate (Ir (tpy)2 (pz2BEt2)); Iridium(III)bis(2'-para-tol-ylpyridnato-N,C2')dihenyl bis(1-pyrazolyl)borate (Ir (tpy)2 (pz2BPh2)); Bis(1-phenylisoquinoline)(acetyl acetonate)iridium(III) (Ir (piq)2(acac)); Bis(2-(4'-fluorophenyl) isoquinoline)(acetyl acetonate) iridium(III) (Ir (piq-F)2 (acac)); Bis(5-(4'-fluorophenyl)-(3,4-benzoquinoline)) (acetyl acetonate)iridium(III) (Ir (pbq-F)2 (acac)); Tris(2-(4'-fluorophenyl)isoquinoline) iridium(III) (Ir (piq-F)3); Tris(1-phenylisoquinoline) iridium(III) (Ir (piq)3); and Tris(5-(4'-fluorophenyl)-(3,4-benzoquinoline))iridium(III) (Ir (pbq-F) 3) can be used.

What is claimed is:

1. A method of producing a luminous material dispersion, the method comprising:
   introducing a vaporized coat agent and an inert gas into an evacuated chamber;
   heating and vaporizing a luminous material in the chamber to obtain a mixed gas comprising the vaporized luminous material and the vaporized coat agent, wherein the luminous material is a fluorescent luminous material or a phosphorescent luminous material;
   liquefying the vaporized coat agent and solidifying the vaporized luminous material by cooling the mixed gas to obtain a liquid coat agent comprising a solidified luminous material; and
   collecting the liquid coat agent and adding the liquid coat agent to a solvent to obtain the luminous material dispersion.

2. The method of claim 1, wherein the luminous material is Tris(8-hydroxyquinolinato)aluminum (Alq3), the coat agent is alkyl amine, and the solvent is a linear non-polar solvent.

3. The method of claim 2, wherein the alkyl amine is octyl amine.

4. The method of claim 2, wherein the linear non-polar solvent is at least one selected from the group consisting of tetra decane, decane, and dodecane.

5. The method of claim 1, wherein the luminous material is a fluorescent luminous material.

6. The method of claim 1, wherein the luminous material is a phosphorescent luminous material.

7. The method of claim 1, wherein the coat agent is an alkyl amine.

8. The method of claim 1, wherein the solvent is a linear non-polar solvent.

9. The method of claim 2, wherein the alkyl amine is at least one selected from the group consisting of octyl amine, buthyl amine, dodecyl amine, hexadodecyl amine, octadodecyl amine, coco amine, tallow amine, hydroxylated tallow amine, oleylamine, lauryl amine, stearyl amine, and cyclohexyl amine.

10. The method of claim 7, wherein the alkyl amine is at least one selected from the group consisting of octyl amine, buthyl amine, dodecyl amine, hexadodecyl amine, octadodecyl amine, coco amine, tallow amine, hydroxylated tallow amine, oleylamine, lauryl amine, stearyl amine, and cyclohexyl amine.

11. The method of claim 7, wherein the alkyl amine is octyl amine.

12. The method of claim 1, wherein the luminous material is at least one selected from the group consisting of Tris(8-hydroxyquinolinato)aluminum(III) (Alq3), bis(10-hydroxygenzo[h]quinolinato)beryllium (BeBq2), bis(8-quinolinolato)zinc (Znq2), (1,10-Phenanthroline)tris[4,4,4-trifluoro-1-(2-thienyl)-1,3-butanedionato]europium(III) (Eu[TTA]3 (Phen)), perylene, quinacridone, coumarin, rubrene, and 4-(dicyanomethylene)-2-t-butyl-6-(1,1,7,7-tetramethyljulolidyl-9-enyl)-4H-pyran (DCJTB).

13. The method of claim 1, wherein the phosphorescent luminous material is at least one selected from the group consisting of Pt(II) Octaethylporphine(PtOEP), (bis(2-(2'-benzothienyl)-pyridinato-N,C3')iridium(III)(acetylacetonate)) (Ir(btp)2(acac)), Tris(2-phenyl pyridine) iridium(III) (Ir(ppy)3), Iridium(III)Bis(2-(4,6-difluorephenyl)pyridinato-$N,C^2$) picolinate (Firpic), Bis(4',6'-difluorophenylpyridinato)tetrakis(1-pyrazolyl)borate (Fir6), Iridium(III)Bis(2-(4,6-difluorephenyl)pyridinato-N,C2) picolinate (FIr(pic)3), Iridium (III)Tris(2-(4-totyl)pyridinato-N,C2) (Ir (M-ppy)3), Iridium (III)Tris(2-(2'-benzothienyl)pyridinato-N,C3' (Ir (btp)$_3$), Bis(dibenzo[f,h]quinoxaline) iridium(III) (Ir (DBQ)2 acac), Iridium(III)bis(2'-para-tol-ylpyridinato-N,C2')diethyl bis(1-pyrazoly)borate (Ir (tpy)2 (pz2BEt2)), Iridium(III)bis(2'-para-tol-ylpyridinato-N,C2' diphenyl bis(1-pyrazolyl)borate(Ir (tpy)2(pz2BPh2)), Bis(1-phenylisoquinoline)(acetyl acetonate)iridium(III) (Ir (piq)2 (acac)), Bis(2-(4'-fluorophenyl)isoquinoline)(acetyl acetonate)iridium(III) (Ir (piq-F)2 (acac)), Bis(5-(4'-fluorophenyl)-(3,4-benzoquinoline))(acetyl acetonate)iridium (III) (Ir (pbq-F)$_2$ (acac)), Tris(2-(4'-fluorophenyl)isoquinoline)iridium(III) (Ir (piq-F)3), Tris(1-phenylisoquinoline) iridium(III) (Ir (piq)3), and Tris(5-(4'-fluorophenyl)-(3,4-benzoquinoline))iridium(III) (Ir (pbq-F)3).

14. The method of claim 4, wherein the linear non-polar solvent is tetra decane.

15. The method of claim 4, wherein the linear non-polar solvent is decane.

16. The method of claim 4, wherein the linear non-polar solvent is dodecane.

17. The method of claim 12, wherein the luminous material is a Tris(8-hydroxyquinolinato)aluminum (Alq3).

* * * * *